United States Patent [19]

Locher

[11] Patent Number: 5,377,480

[45] Date of Patent: Jan. 3, 1995

[54] APPARATUS FOR CUTTING DOWN ELONGATED STANDING CROPS, PARTICULARLY STALK MATERIAL

[76] Inventor: Hans Locher, Kurvenstrasse 14, CH-8610 Uster, Switzerland

[21] Appl. No.: 107,700

[22] PCT Filed: Dec. 11, 1992

[86] PCT No.: PCT/CH92/00240

§ 371 Date: Aug. 18, 1993

§ 102(e) Date: Aug. 18, 1993

[87] PCT Pub. No.: WO93/11658

PCT Pub. Date: Jun. 24, 1993

[30] Foreign Application Priority Data

Dec. 18, 1991 [CH] Switzerland ............. 03745/91

[51] Int. Cl.$^6$ .................. A01D 34/73; A01D 34/13; A01G 3/04
[52] U.S. Cl. .......................... 56/102; 56/99; 56/246; 56/293
[58] Field of Search ............. 56/293, 102, 246, 234, 56/155, 53

[56] References Cited

U.S. PATENT DOCUMENTS

| | | | |
|---|---|---|---|
| 499,967 | 6/1893 | Case | 56/246 |
| 1,476,521 | 12/1923 | Kell | 56/102 |
| 1,535,640 | 4/1925 | Wilson | 56/293 |
| 1,741,938 | 12/1929 | Holtz | 56/102 |
| 1,989,821 | 2/1935 | Peterson | 56/246 |
| 2,984,962 | 5/1961 | Heising | 56/102 |
| 4,048,791 | 9/1977 | Treen | 56/17.6 |
| 4,805,387 | 2/1989 | Bouin | 56/102 X |

FOREIGN PATENT DOCUMENTS

| | | |
|---|---|---|
| 103525 | 6/1926 | Austria . |
| 0069110 | 1/1983 | European Pat. Off. . |
| 0201104 | 11/1986 | European Pat. Off. . |
| 0422773 | 4/1991 | European Pat. Off. . |
| 329444 | 10/1904 | France . |
| 1223601 | 8/1966 | Germany . |
| 3621610 | 1/1988 | Germany . |
| 3729487 | 3/1989 | Germany . |
| 4020114 | 1/1992 | Germany . |
| 1379073 | 1/1975 | United Kingdom . |
| 948330 | 8/1982 | U.S.S.R. . |
| 971157 | 11/1982 | U.S.S.R. . |
| 1586587 | 8/1990 | U.S.S.R. . |

*Primary Examiner*—Stephen J. Novosad
*Attorney, Agent, or Firm*—Burns, Doane, Swecker & Mathis

[57] ABSTRACT

The cutting device proposed has cutting cells (3), located side by side, which collect the items to be cut. Each cell (3) contains a stationary element, which is designed to act as a support for the items to be cut and has a stop edge for the items, and a mobile element (4) which is designed to press the items together in the cell (3). During the cutting process, the mobile element is driven so that it remains substantially parallel to the support edge, and its motion during cutting is tangential to the items being cut. This tangential cutting action enables very considerable reductions to be made in energy consumption and noise generation. The cutting device is suitable for use in grass mowers, agricultural reaping and mowing machines and hedge clippers.

25 Claims, 7 Drawing Sheets

APPARATUS FOR CUTTING DOWN ELONGATED STANDING CROPS, PARTICULARLY STALK MATERIAL

FIELD OF THE INVENTION

The present invention relates to the field of agricultural mowing machines and lawn mowers for tending grass areas.

BACKGROUND OF THE INVENTION

At the present time, agricultural mowing machines and lawn mowers are substantially of two widely used types, namely principally free-cutting rotary mowing machines and to a lesser extent, beam mowers.

Rotary mowing machines, the principle of which is also applied to many lawn mowers, work with very high peripheral speeds Of the cutters fastened on the outside of a rotor. These speeds amount to about 40 to 80 meters per second, so that enormous centrifugal forces are produced. If foreign bodies, for example stones, come into the range of action of the cutters and are thrown off, there is a serious risk to animals and people.

With beam mowers problems arise through friction between the stationary and moving parts of the mowing system, particularly through the penetration of sand, dirt or plant sap into the zone between the two parts. This results in high energy consumption, even during idling. In addition, the cutters must be regularly re-ground.

Since rotating rotary mowing machines and lawn mowers have a relatively high power consumption because of the high peripheral speeds, only two types of drive are available for known types of mowing machines and lawn mowers, namely either an electric motor connected to the mains or a petrol or diesel engine, the engine being used either as a direct drive, as in the conventional lawn mower, or as an indirect drive via the so-called power take-off shaft of a tractor for agricultural machines. In the case of the electric motor the autonomy of the mower is restricted by the length of the power cable and there is a danger that the cable will become caught in the mower. In the case of the petrol engine, the noise and exhaust gases are a nuisance, so that the use of such mowers is increasingly controlled by regulations. Thus, for example, in some countries noise emission is already limited by law.

In the case of agricultural applications the relatively high weight of mowing machines and their tractors is an additional disadvantage, since it is well known to lead to extremely undesirable soil compaction.

SUMMARY OF THE INVENTION

The invention now seeks to indicate a mowing apparatus which is distinguished by low energy consumption and with which there is no danger to people or animals from parts or objects thrown off. In addition, the mowing machine according to the invention should also be as light as possible, so that undesirable soil compaction does not occur.

The invention relates to an apparatus for cutting down elongated standing crops, particularly stalk material, which has a cutting compartment to receive the crop and has a static member acting as an opposing bearing for the crop and provided with a stop edge for the latter, and which has a movable member which compacts the crop in the cutting compartment, the crop being cut off by the cooperation of the two members.

The apparatus according to the invention is characterised in that during the cutting operation the movable member is driven substantially parallel to said stop edge, and in that the movement during cutting is made tangentially to the crop.

The feature of the invention that "during the cutting operation the movable member is driven substantially parallel to said stop edge" means that the movement component of the movable member in the direction parallel to the stop edge is greater than that in the direction at right angles to the latter, namely during the cutting down of the crop. During the cutting phase the movable member thus moves substantially along the stop edge, and this movement permits the tangential cutting of the crop, this cutting being distinguished in particular by extremely low energy consumption and equally low noise emission.

This tangential cut is a genuine cut, comparable with the cut made by a domestic blade, and requires the application of substantially less force because at the same time as the blade penetrates into the material to be cut it makes a longitudinal movement, quite contrary to the usual knocking-over or bending-over of the crop such as occurs in known free-cutting rotary mowers. Lower speed also means lower energy requirements, less noise, less waste of energy through friction and the like, and greatly reduced danger from objects thrown off.

The crop consists essentially of plant fibres, which because of their relatively great shear strength require heavy forces when cut diagonally, whereas for tangential cutting relatively light forces and also lower speeds are sufficient.

As practical tests have shown, energy requirements are drastically reduced, namely by about 90%. This in turn means that for lawn mowers electric drive by means of batteries is possible, while at the same time the weight of the respective mower is reduced. This has the consequence that on the one hand battery-operated lawn mowers become possible for tending grass areas, and that on the other hand a decisive reduction of weight is also achieved for agricultural mowers, and this in turn makes it possible to use lighter tractors. A substantial contribution is thereby made to easing the burden on fodder grass land, because its compaction is greatly reduced.

A first preferred embodiment of the cutting apparatus is characterised by a plurality of cutting compartments which are disposed side by side, are open on one side, are each provided with a movable member and have an approximately U-shaped or V-shaped cross-section, and whose mouth-like opening is provided for the entry of the crop, while in said compartments at least one of the two legs is constructed as said static member.

A second preferred embodiment is characterised in that each movable member has an elongated shape, is directed parallel to the leg forming the static member and is driven circularly.

According to a third preferred embodiment the movable member and/or the static member is or are in the form of a cutter. In this respect the last-mentioned variant has proved to be particularly advantageous, because blades constructed in this way are easily exchanged, so that the user-friendliness of a mower of this kind is quite considerably increased. The first-mentioned variant is of course also advantageous and it will have to be decided, depending on the application, which variant is to be given preference.

Another preferred embodiment relates to an apparatus according to the invention for application to hedge trimmers. This apparatus is characterised in that the movable member is formed by an elongated cutter provided with a wavy cutting edge or a toothing and swivelable relative to the stop edge.

It has been found that through the use of the tangential cut a considerable reduction of driving power, of about 85%, is also obtained for hedge trimmers, so that a substantially lighter motor can be used and handling is greatly improved. In addition, battery operation is possible, and the battery can have a low weight.

BRIEF DESCRIPTION OF THE DRAWING FIGURES

The invention is explained more fully below, with the aid of exemplary embodiments, and in the drawings, in which:

FIGS. 1a to 1c show diagrams explaining the operating principle of three exemplary embodiments of cutting apparatuses according to the invention, FIG. 2 shows in perspective a cutting apparatus working in accordance with the principle illustrated in FIG. 1a, FIGS. 3a and 3b show variants of details of the cutting apparatus shown in FIG. 2, FIG. 4 shows a detail of a cutting apparatus working in accordance with the principle shown in FIG. 1b, FIG. 5 shows another variant of a detail of the cutting apparatus shown in FIG. 2, FIG. 6 shows a view of a detail of a cutting apparatus working in accordance with the principle shown in FIG. 1c, FIGS. 7a–7c show schematically a cutting apparatus according to the invention for agricultural use, FIG. 8 shows a view of a detail of a hedge trimmer equipped with a cutting apparatus according to the invention, and FIGS. 9 and 10 show two preferred exemplary embodiments of cutting compartments in cutting apparatuses according to the invention.

DETAILED DESCRIPTION OF THE INVENTION

Figure 1A:
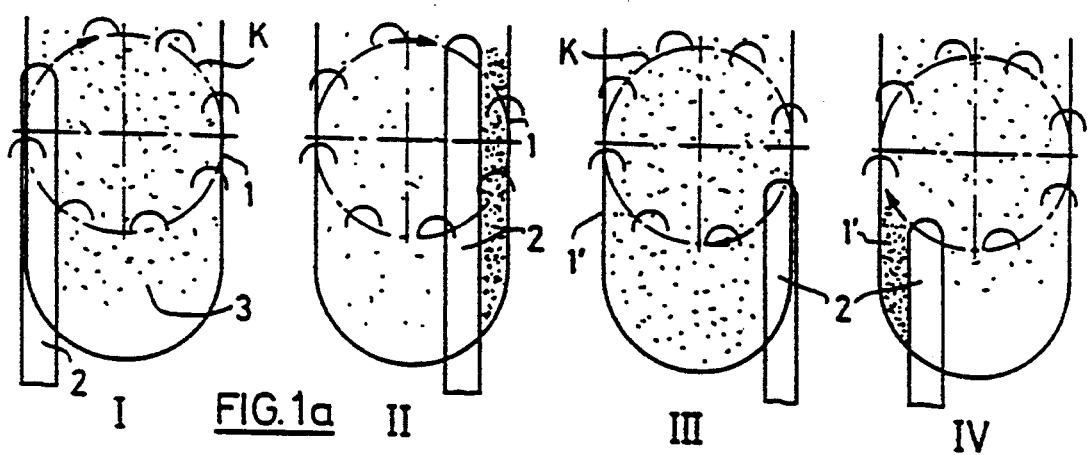
Figure 1B:
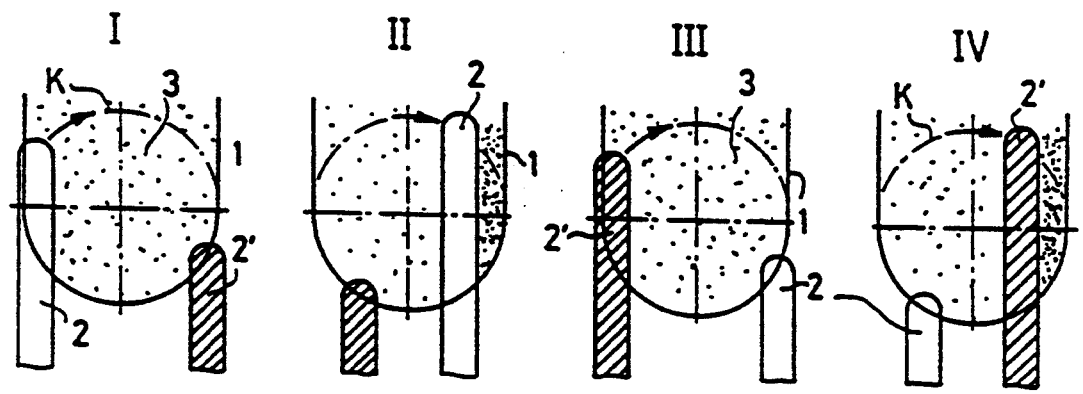
Figure 1C:
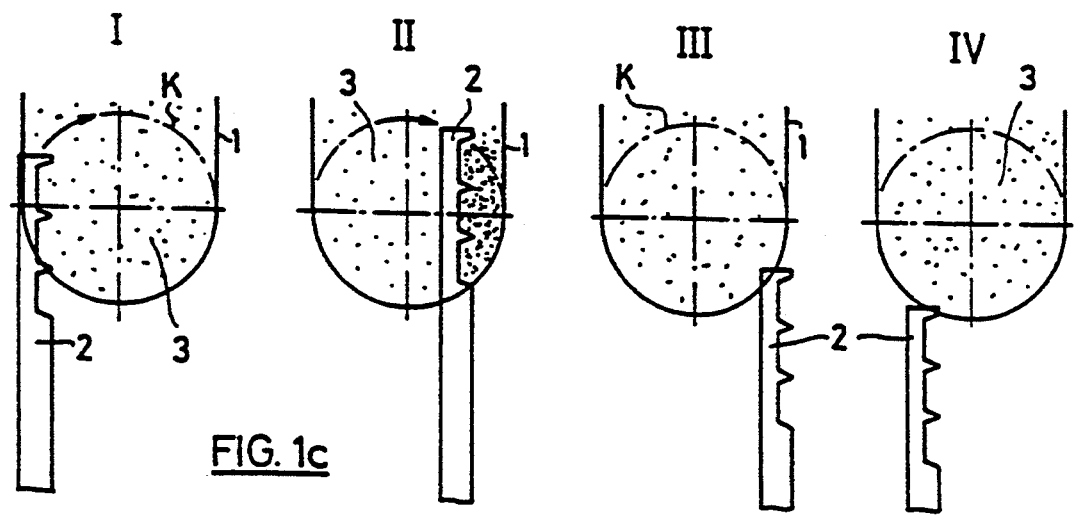

FIGS. 1a to 1c illustrate with the aid of diagrams in plan view the operating principle of a cutting apparatus according to the invention, wherein in each case four instantaneous states of a cutting cycle are shown. The cutting apparatus comprises in all three figures at least one static member 1 and one movable member 2, two static members 1, 1' being provided in the example shown in FIG. 1a and two movable members 2, 2' being provided in the example shown in FIG. 1b. When mention is made in the following description of one movable member and one static member, the embodiments comprising two static members 1 and 1' (FIG. 1a) and two movable members 2 and 2' (FIG. 1b) are thus obviously also to be included.

The static member 1, 1' forms part of a cutting compartment 3, which in the figures is symbolised by a U and has a mouth-like opening for the entry of the crop and also an edge. The static member 1, 1' is disposed in the cutting compartment 3, namely at its edge, preferably along one of the legs of the U-shaped cross-section, and forms a stop edge for the crop. It may here be pointed out that the cross-section of the cutting compartment 3 obviously need not be strictly U-shaped but may also have the shape of a V, an inverted trapezium, or an intermediate shape.

The essential requirement is a kind of mouth shape which has the effect that in the case of a movement of the cutting compartment 3 relative to the crop, such as occurs regularly during mowing, the crop enters the cutting compartment 3 and is collected therein. The movable member 2, 2' is driven circularly and has an elongated shape; it is directed parallel to the stop edge, or one of the stop edges, constituting the static member 1, 1'.

The crop collected in the cutting compartment is then cut off through the cooperation of the movable member 2, 2' and the static member 1, 1'. This cutting-off can be imagined as the compaction of the crop in the cutting compartment 3 like a bunch of grass grasped by a hand, whereupon the crop is cut off tangentially as if cut by a blade held by hand.

In FIGS. 1a to 1c the circle K described by the tip of the movable member 2, 2' during a cutting cycle is in each case shown in dot-dash lines. On this circle eight positions of this tip, mutually spaced 45° apart, are represented in FIG. 1a by a semicircle, and the diagrams I to IV in the various figures show in each case one characteristic position of the movable member 2, 2'.

In the diagrams I the member 2, driven in the direction of the arrow, starts to move from the left-hand edge of the cutting compartment 3 transversely to the opening, and thus pushes the crop contained in the cutting compartment towards the right-hand edge, which acts as a stop edge, so that the crop is compacted. In diagram II the crop is already greatly compacted and, as the movable men%her 2 continues to move along the circle K, the crop is cut down. The crop, which at that moment is separated from the roots,is inclined backwards because of the forward movement of the mower, and flows off.

As is well known, any rotational movement on a surface can be represented as the total of two rectilinear movement components. If these movement components are so selected that one of them extends parallel and the other at right angles to the stop edge, it can be seen that in each case, from the position of the movable member 2 shown in diagram II to that shown in diagram III, the movement component of said member in the direction parallel to said stop edge is greater than that in the direction at right angles to the latter. Since this is the part of the cutting cycle in which the crop is cut down, it can consequently be said that the movable member is driven substantially parallel to the stop edge during the cutting operation.

In the position shown in diagram III the movable member 2 already moves away from the stop edge back to the left-hand edge of tile cutting compartment 3. In the position shown in diagram IV the movable member 2 is in the same position, relative to the left-hand edge of the cutting compartment 3, as that, relative to the right-hand edge, shown in diagram II. The crop pushed together and compacted by the movable member 2 on its path from the position shown in diagram III to the position shown in diagram IV is then cut.

From this cycle various possibilities arise for the configuration of the static and movable members 1, 1' and 2, 2' respectively, of which at least one is preferably in the forte of a blade. These possibilities are as follows:

FIG. 1a: The cutting compartment 3 has a depth distinctly greater than the diameter of the circle K, which has the consequence that the crop is also compacted during the movement of the movable member 2 between the positions shown in diagrams III and IV.

Both longitudinal edges of the cutting compartment 3 accordingly act as stop edges, or in other words, the cutting compartment 3 contains two static members 1 and 1'. In this case the movable member 2 is in the form of a double blade having two cutting edges and two cuts are made per cutting cycle, naively a complete cut of all the crop in the cutting compartment 3 and additionally a partial cut of the crop contained in the bottom part of the cutting compartment 3.

FIG. 1b: The cutting compartment 3 has a depth approximately equal to the diameter of the circle K, and there is no noteworthy compaction of the crop during the backward movement of the movable member 2 from position III to position IV, so that only one stop edge and therefore only one static member 1 is provided. The movable member accordingly has a cutting edge only on its right-hand edge adjoining the stop edge.

If in FIG. 1b only one of the two movable members 2, 2' shown were provided, only one cut would be made per cutting cycle and the cutting power would be only half as great as in the example shown in FIG. 1a. However, the figure shows two movable members 2 and 2' offset 180° relative to each other, so that the cutting power is approximately equal to that in the example shown in FIG. 1a.

FIG. 1c: Here the functions of the static and movable members are transposed, so that the stop edge of the cutting compartment 3 which constitutes the static member 1 acts as the cutting blade. The movable member serves only to compact the crop, and on its edge which compacts the crop it is given a shape enabling the crop to be carried along effectively. This configuration may, for example, consist of a grooving or of a toothing. Similarly to FIG. 1b, the depth of the cutting compartment corresponds approximately to the diameter of the circle K, so that the cutting power amounts to about 50% of that of FIG. 1a. This can be doubled if, similarly to FIG. 1b, two movable members offset by 180° are used.

As a further variant to FIG. 1c, the cutting compartment 3 may, similarly to FIG. 1a, have a depth greater than the diameter of the circle K and the movable member 2 may be provided on both longitudinal edges with a grooving or with a toothing. The left-hand longitudinal edge of the cutting compartment 3 would then correspondingly also act as the static member 1' and would in that case be in the form of a blade. In all cases both the movable member and the static member could of course carry a cutting edge and act as a blade, or a blade could be dispensed with, although this will rather seldom be the case. It is possible to combine together in any desired manner the different variants—short or long cutting compartment, static or movable member in the form of a cutting blade, and one or two movable members.

Figure 2:
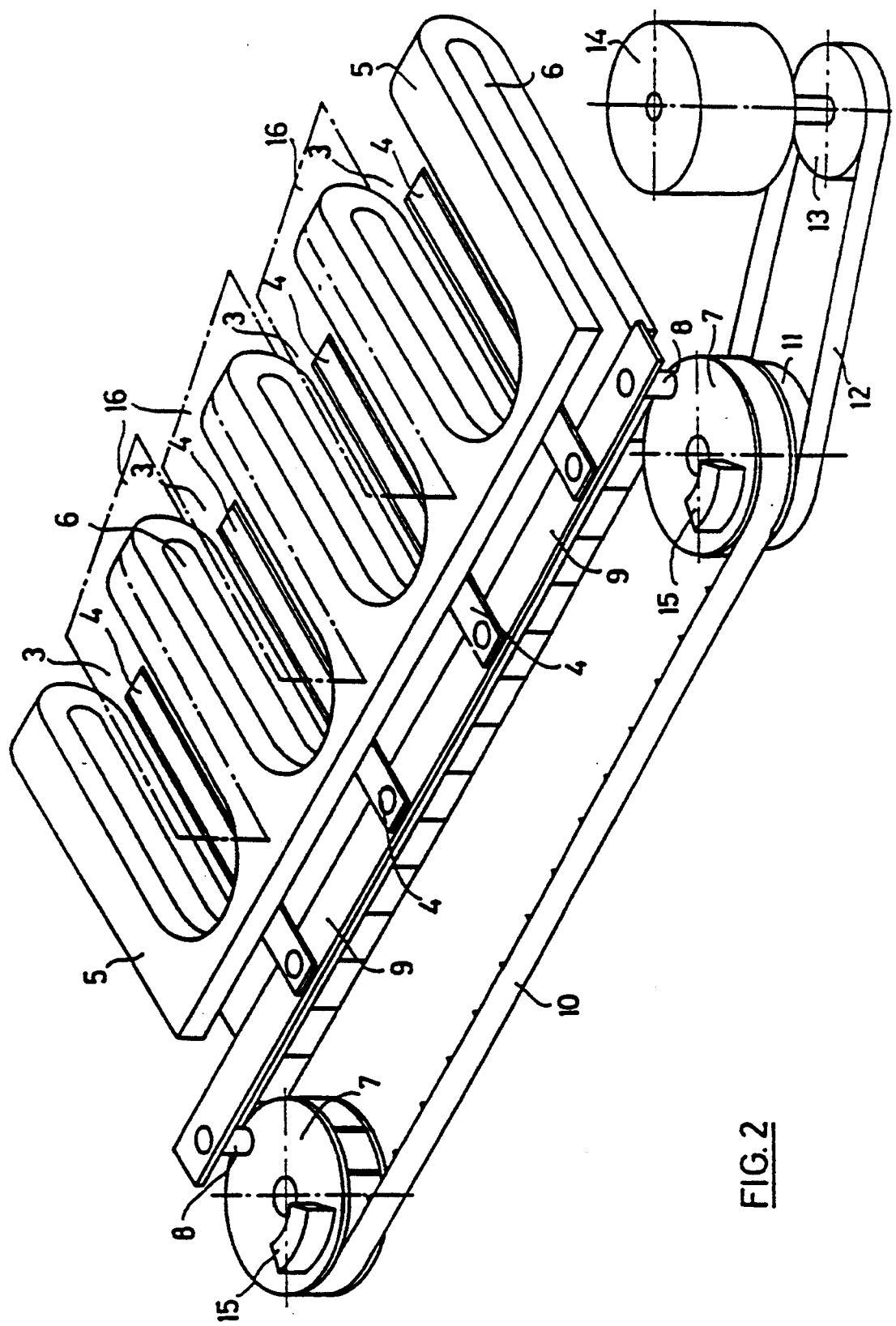
Figure 4:
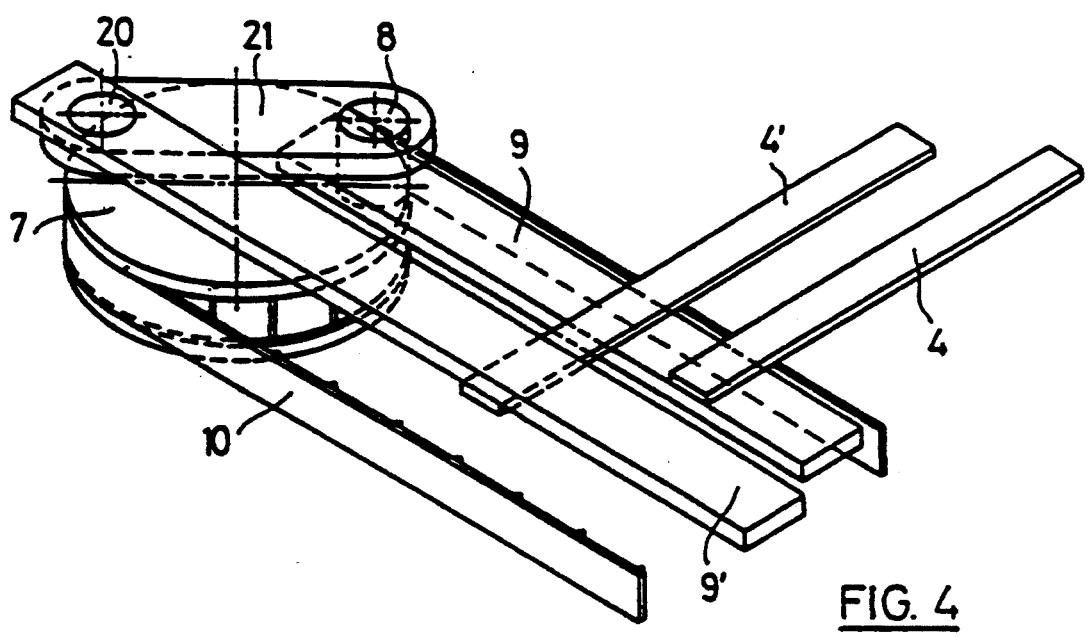

Embodiments, of cutting apparatuses for the various principal possibilities illustrated in FIGS. 1a to 1c will now be described. FIG. 2 thus shows a cutting apparatus and FIG. 5 the cutting compartment of such an apparatus in accordance with the principle of FIG. 1a, FIG. 4 shows a detail of a cutting apparatus according to the principle of FIG. 1b, and FIG. 6 shows the cutting compartment of a cutting apparatus according to the principle of FIG. 1c.

FIG. 2 shows a view of a mowing rotor which has four cutting compartments 3 disposed side by side. The mowing rotor is in practice substantially wider and accordingly also contains more cutting compartments. The inside width of the cutting compartments is of the order of centimeters and amounts for example to about 3 to 4 centimeters in the case of lawn mowers for tending grass areas, and to about 5 to 7 centimeters in the case of agricultural mowers. Each cutting compartment contains a circularly drivable blade 4 of elongated shape, which is directed parallel to the legs or side edges of the cutting compartments and on both longitudinal edges is provided in each case with a cutting edge.

The mowing rotor consists of a two-part sandwich-like mowing beam 5, between the two parts of which is formed a gap 6 which is closed at the front, in the mowing direction, but otherwise is free. The blades 4 can penetrate laterally into this gap in the region of the side edges of the cutting compartments 3, whereby cutting safety is improved. In the region of the bottom of the cutting compartments 3 said gap 6 permits free passage of the ends of the blades 4 to enable them to be driven.

The drive of the blades 4 is composed of a driving rod 9 which is eccentrically mounted on driving wheels 7 by a respective eccentric pin 8 and on which the blades 4 are exchangeably fastened. The two driving wheels 7 are connected together frictionally, that is to say without slip, by means of a cogged belt 10 in the case illustrated. On the shaft of one of the two driving wheels 7 is mounted a drive pulley 11, which is connected by a belt 12 to the belt pulley 13 of a motor 14.

In order to compensate for the imbalance resulting from the eccentric mounting of the driving rod 9, each driving wheel 7 carries an appropriate balancing weight 15. In the case of longer driving rods a supporting wheel similar to the driving wheels may be disposed, if desired, between the driving wheels 7, and would then likewise have to be provided with a balancing weight.

In order to prevent the crop from falling into a neighbouring cutting compartment after it has been cut and to ensure that it will dependably flow off to the rear, separating plate 16, shown in dot-dash lines in FIG. 2, are provided between the individual cutting compartments 3. If these plates, as indicated in the figure, are wedge- or wing-shaped and project forwards away from the mowing beam 5, they will in addition bring about a separation of the grasses and stalks, which often become intertwined in their growth, thus facilitating the cutting.

Figures 3A, 3B:
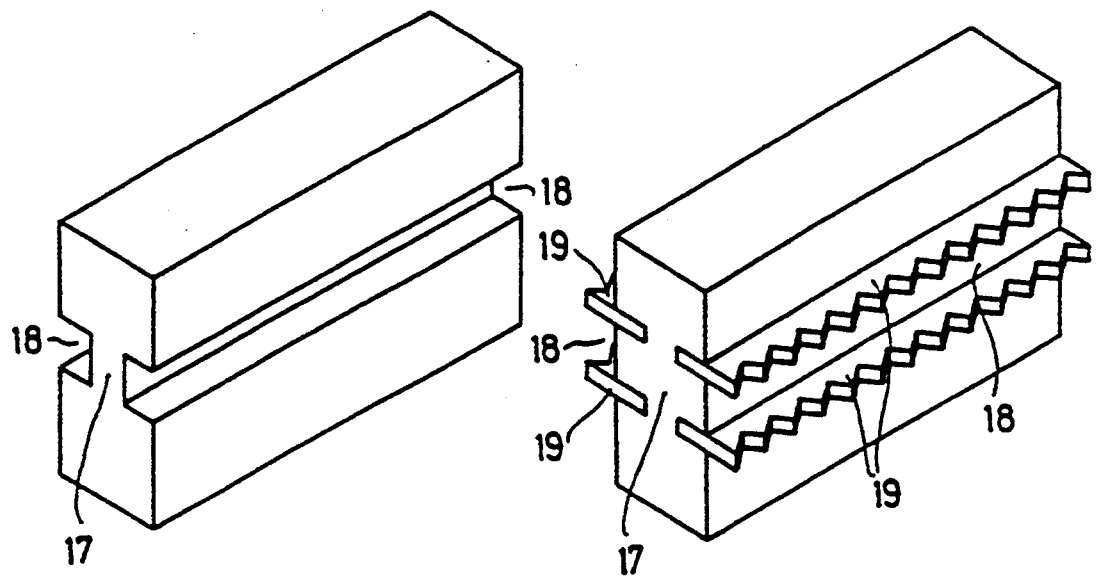

As another means of preventing the crop from penetrating into a neighbouring cutting compartment 3, the gap 6 (FIG. 2) can be closed, as shown in FIGS. 3a and 3b, by a web 17, so that at each side edge a groove-like depression 18 is formed for the at least partial entry of the blades 4 (FIG. 2). To improve the securing of the crop at the side edges the groove 18 between two profiled bars 19 may be provided, as shown in FIG. 3b, with a serrated or grooved edge, which not only serves as opposing bearing or stop for the crop, but also secures the latter against slipping along the edge during the compaction and cutting.

The drive shown in FIG. 2 for the blades 4 forming the movable member 2 (FIG. 1a) may be substantially used for all embodiments, even for those in which the movable member serves only as an opposing bearing for the crop (FIG. 1c). When two movable members are used for each cutting compartment (FIG. 1b), the drive must be modified accordingly, as can be seen in FIG. 4, which shows the drive in the region of the driving wheel 7 which is on the left in FIG. 2. As shown in the figure, a second driving rod 9' is provided, on which a row of second blades 4' is fastened. The second driving rod 9' is pivotally connected by means of a pin 20 to a carrier plate 21, which in turn is rigidly fastened on the eccentric pin 8 (FIG. 2). The pin 20 is situated symmetrically to the eccentric pin 8, in relation to the axis of rotation of the driving wheel 7, so that the first and second blades 4 and 4' each make an identical movement, but with a phase displacement of 180°. The balancing weight 15 provided in FIG. 2 is no longer required, given appropriate dimensioning of the pin 20. In the region of the driving wheel 7 situated on the right in FIG. 2 the drive has a corresponding configuration.

Figure 5:
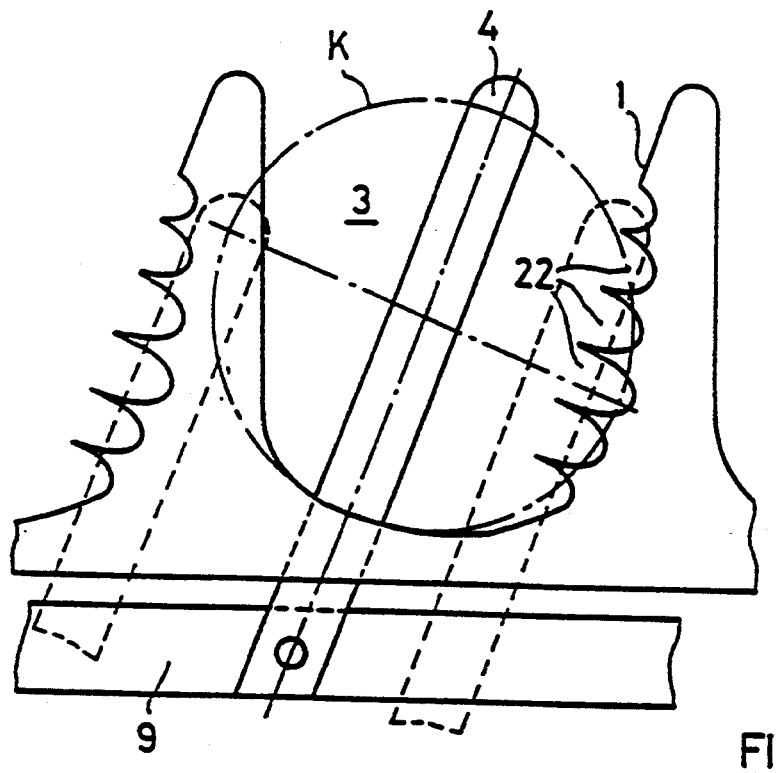
Figure 6:
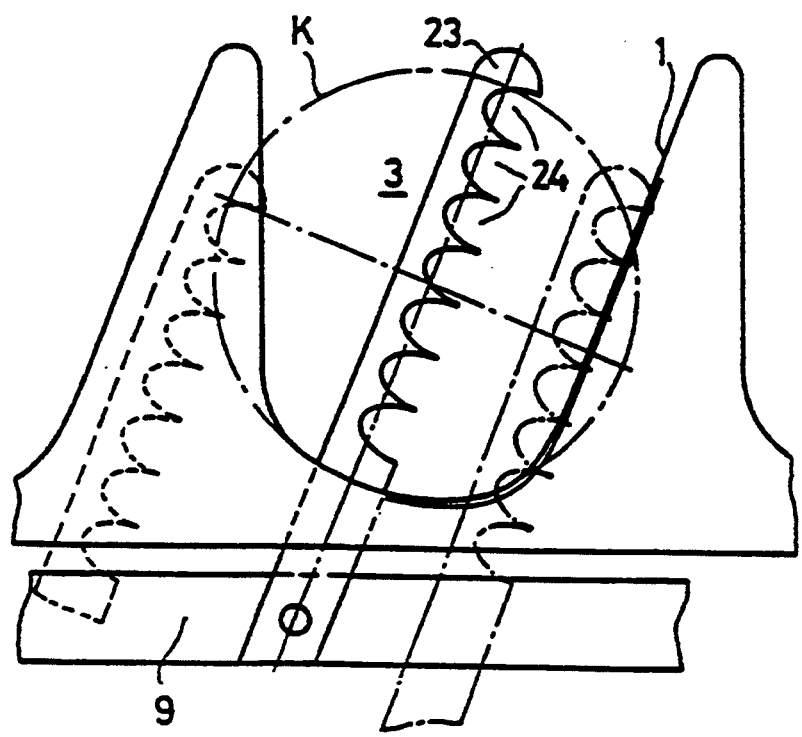

FIG. 5 shows a variant of the cutting compartment 3 of the mowing rotor illustrated in FIG. 2, which is very suitable in particular for close growths of stalk material, and those having very tough stems, where a firm hold is required during cutting. It has been found that the variant illustrated in FIG. 3b, provided with the profiled bars having a serrated or grooved edge, does not in all cases give the necessary hold for stalk material of this kind, so that it is advisable to provide the stop edge with indentations 22, into which the crop is forced and in which it is also contracted. The crop is received in the indentations 22 and cannot avoid the action of the movable member 2 (FIG. 1a) which is in the form of a blade 4.

As a further difference from FIG. 2, the blade 4 and the stop edge loaning the static member 1 are not directed at right angles to the driving rod 9, but are inclined at about 20° to 30° to the vertical. This arrangement has the advantage that the outward flow of the cut stalk material opposite to the mowing direction, that is to say to the rear, is assisted.

Similarly to FIG. 1a, the depth of the cutting compartment 3 could obviously here be substantially greater than the diameter of the circle K, and a double blade could be used. In this case it is to be recommended that indentations similar to the indentations 22 should likewise be provided in the transition region between the curved bottom of the cutting compartment 3 and its left-hand stop edge forming the second static member.

FIG. 6 shows a view of a cutting compartment 3 of a cutting apparatus working in accordance with the principle of FIG. 1c, wherein the static member 1 is in the form of a cutting blade and the movable member 2 (FIG. 1c) is in the form of a feeder 23 for the crop. The feeder 23 has a comb-like shape and is provided with indentations 24 along its longitudinal edge facing the static member 1, so that that the crop moving towards the static member 1 is to a considerable extent gripped at the right-hand edge of the cutting compartment 3 and is thus guided largely positively, whereby cutting safety is improved.

The feeder 23 is fastened on the driving rod 9, although not at right angles as in FIG. 1c, but in an inclined position at about 20° to 30° to the vertical. The static member 1 in the form of a blade has the same inclination as the feeder 23; the shape of the cutting edge is indicated in the figure by a double line.

The feeder 23 serving as movable member is shown in three positions, namely in a left-hand position, shown in dashed lines, directly before it penetrates into the cutting compartment 3, in a middle position shown in solid lines, and in a position, shown in dot-dash lines, on the right-hand side immediately after commencement of the tangential cut.

The feeder 23 may be disposed close below or above the static member 1, or it may also be in the form of a double member composed of two substantially identical parts. In the latter case one part of the double member is disposed close below and the other part close above the static member, and the two parts are joined together, preferably in the region of the tip of the feeder, so that by means of its two parts the latter can engage like claws around the static member from the cutting compartment 3. This configuration of the feeder 23, together with the inclined position of the static member 1 and of the feeder, leads to an improvement of the outward flow of the crop cut to the rear.

Figure 7A:
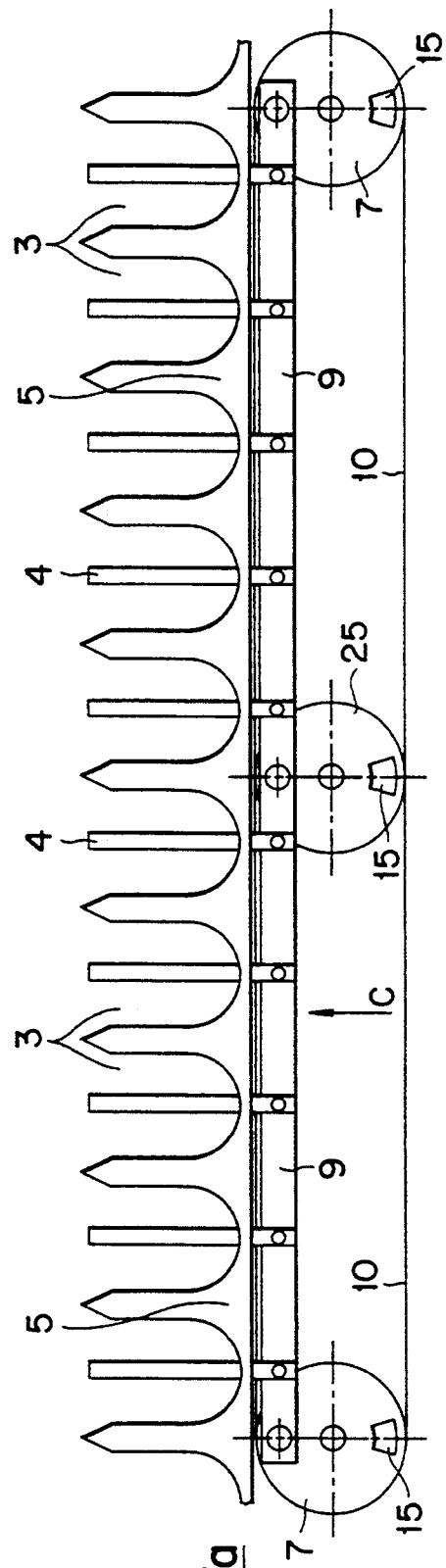
Figure 7B:
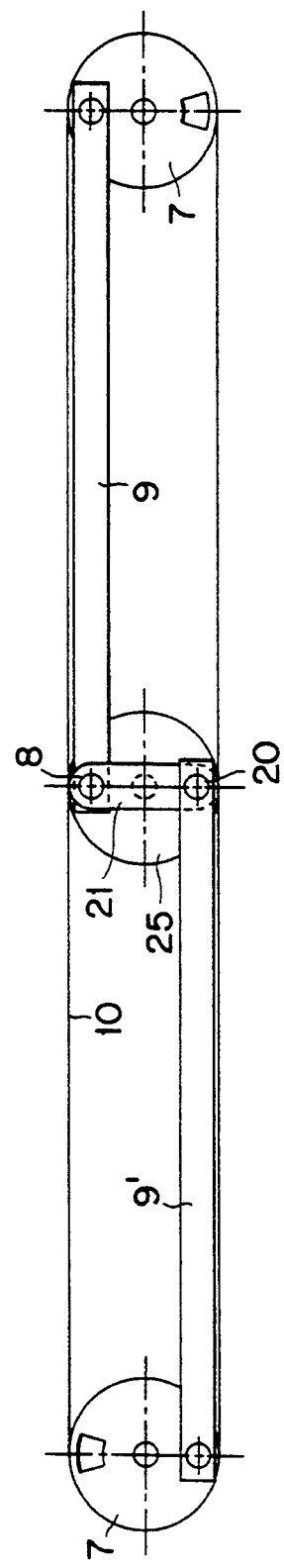
Figure 7C:
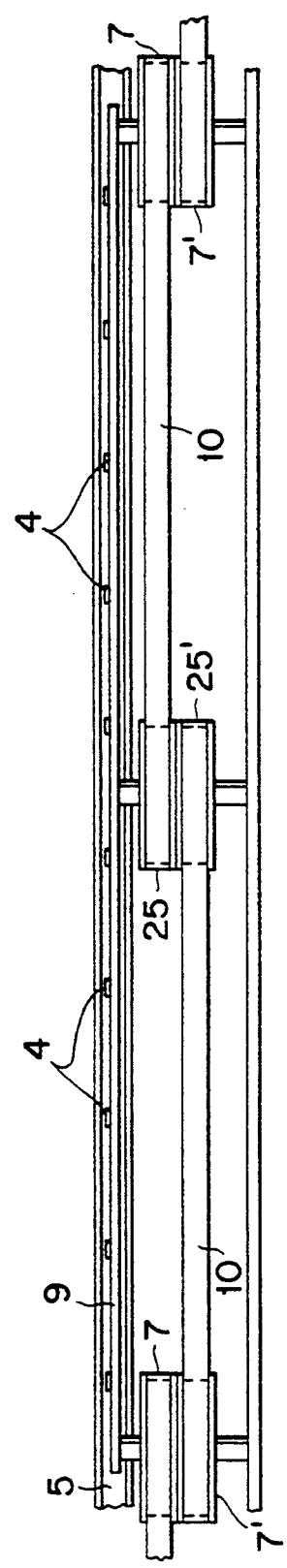

FIGS. 7a to 7c show a mowing apparatus intended for agricultural use, FIG. 7a being a plan view of a mowing beam, and FIG. 7c a view in the direction of the arrow C in FIG. 7a. FIG. 7b shows a variant of the drive of the mowing beam shown in FIG. 7a.

In agricultural mowing machines the mowing widths amount to about 1.5 to 2 meters, so that correspondingly long driving rods 9 (FIG. 2) are required and, in order to obtain the necessary stiffness, must then have a relatively high weight. As has already been mentioned in the description of FIG. 2, this problem can be solved by providing supporting wheels 25, which on the one hand serve as supports for the driving rod 9 and on the other hand, like the driving wheels 7, are frictionally driven. According to FIG. 7a the supporting wheel 25 is driven by the cogged belt 10 frictionally connecting the two driving wheels 7. Like the driving wheels 7, the supporting wheel 25 is provided with a balancing weight 15 to compensate for unbalance.

The balancing weight 15 can be dispensed with for the supporting wheel 25 if, instead of a single driving rod 9, two driving rods are used and driven with a phase displacement of 180°. According to FIG. 7b, in this case the supporting wheel 25 carries, similarly to FIG. 4, a carrier plate 21 mounted on the eccentric pin 8 for the first driving rod 9 and provided with a pin 20 on which the second driving rod 9' is pivoted. This embodiment has the advantage that, because of the phase displacement of the two driving rods, the blades carried by the latter likewise come into action with a phase displacement of 180°, so that the torque required for one cut per mowing beam length or mowing width is halved.

The cutting or mowing apparatus described can be adapted in a simple manner to any mowing width by assembling individual modules of the type illustrated in FIG. 2. This assembly becomes very simple particularly when, as shown in FIG. 7c, two driving wheels 7, 7' or 25, 25' respectively, disposed one above the other, are provided per mounting point of the driving rods 9, in which case the drive is effected between neighbouring driving or supporting wheels by cogged belts 10 alternately connecting the upper or lower wheels.

Figure 8:
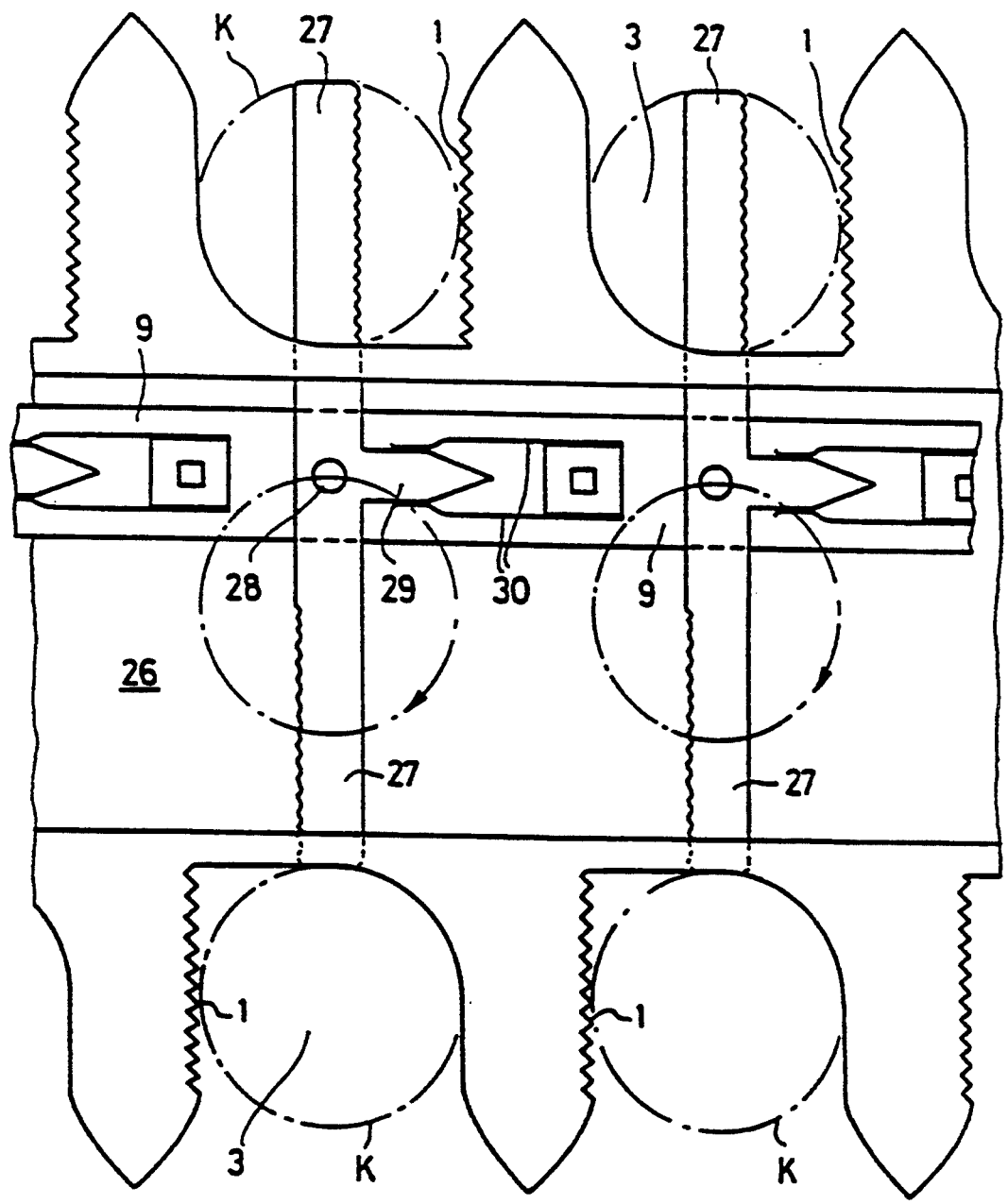

In addition to use for lawn mowers for tending grass areas and for agricultural mowers, the cutting apparatus according to the invention can also be employed for hedge trimmers, for which FIG. 8 gives one example. FIG. 8 is drawn to the scale of about 2:1 and shows in plan view a part of the cutting beam of a hedge trimmer which has a customary length of about 45 to 60 centimeters and consists of a web- or rail-like middle part with cutting compartments 3 disposed on both sides.

The cutting compartments 3, which are equipped in the same way as the cutting compartments of the mowing beam shown in FIG. 7a and each of which has a movable member 2 (FIG. 1a) in the form of a blade 27, are disposed symmetrically to the middle part of the cutting beam 26, so that in each case two cutting compartments lying opposite one another, one on each side of the cutting beam 26, are associated with a common blade 27.

Similarly to FIGS. 2 and 7, driving wheels (not shown) driven by cogged belts are provided along the middle part of the cutting beam 26 and drive a driving rod 9. The blades 27 are fastened on the driving rod 9 with a spacing corresponding to the pitch of the cutting compartments 3 and extend on both sides of the driving rod 9 towards the respective cutting compartments 3. The geometry of the arrangement and the dimensions of the blades 27 and of the circle K (FIG. 1a) are so selected that the blades are always fully inserted into only one of the two rows of cutting compartments—in FIG. 8 the upper row. After further movement of the driving rod 9 by 180°, the blades 27 are then fully inserted into the bottom row of cutting compartments.

In contrast to the embodiments so far described, the blades 27, instead of being fastened rigidly on the driving rod 9, are pivotable about a mounting pin 28. The blades 27 have a linger-like extension 29, on each side of which a respective leaf spring 30 acts, whereby the blades 27 are pressed by spring force under initial stress into their normal position shown in the figure and are positioned therein. As shown in the drawing, the blades 27 are provided on their cutting edge with a wavy cutting edge or a kind of toothing, and the stop edge of the cutting compartment 3, which forms the static member 1, has a toothing serving to secure the crop.

The pivotable mounting enables the blades 27 to yield to thicker branches, which do not then have to be cut in one rotation of the blades. Practical tests have shown that with blades provided with wavy cutting edges it is possible to cut through branches up to a diameter of about 6 to 7 millimeters in a single cut, and that for thicknesses of 8 to about 10 millimeters up to three cuts are necessary, which with the usual speed of about 1200 revolutions per minute gives a cutting time of the order of tenths of a second.

For thicker branches having a diameter of 10 to 20 millimeters, although these are rather rare in hedges but nevertheless do occur, special sawing compartments are provided at the end of the cutting beam 26, at the handles. These are larger than the cutting compartments 3 illustrated and, instead of the blade 27, contain a corresponding pruning saw blade, with which the branches can be sawn off singly.

Because of these sawing compartments and because of the pivotable blades, the blockages which occur, even with relatively thin branches, in known hedge trimmers are practically impossible. Pivotable blades of the type described can also be used in mower applications as a safety device protecting against stones and the like.

Since energy consumption is reduced by about 85% in comparison with conventional hedge trimmers, the drive motor of the hedge trimmer described is correspondingly lighter and its total weight is considerably reduced. Furthermore, this reduction of energy consumption makes it possible for the first time to employ electric battery drive with a realistic operating life. In this case the batteries may either be carried on the operator's body or be disposed in a separate box.

Figure 9:
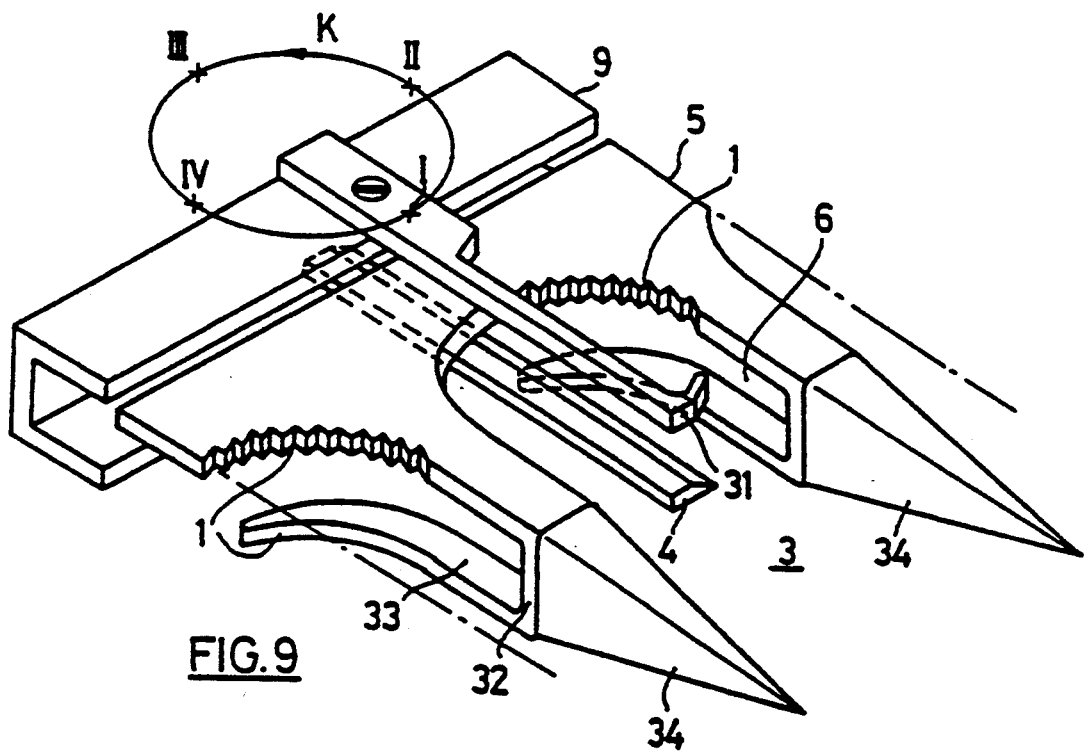
Figure 10:
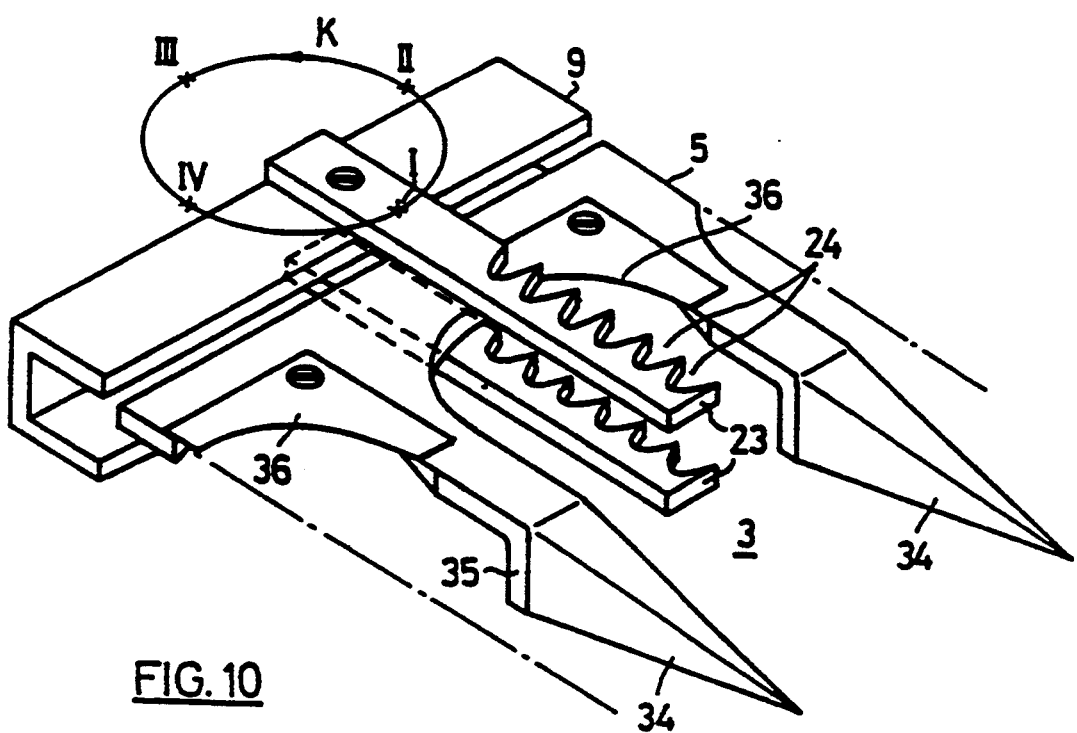

In FIGS. 9 and 10 two exemplary embodiments for cutting compartments 3 are shown, which have been particularly successful in practical use and which differ essentially in that in the one case (FIG. 9) the movable member and in the other case (FIG. 10) the static member is formed as a blade.

In the example shown in FIG. 9 the movable member 2 (FIG. 1) is in the form of a twin member and consists of a blade 4 and a hook 31. The driving rod 9 (FIG. 2) is in the form of a recumbent U-shaped profile and the hook 31 is fastened on the top horizontal side wall of the profile and the blade 4 on the bottom horizontal side wall of the latter, so that the blade 4 and the hook 31 describe the same circular path K during operation.

The mowing beam 5 is connected at its end face remote from the driving rod 9 by means of a web 32 to wing-like parts 33 disposed parallel to the mowing beam. Horn-like members 34 are fastened on the webs in order to unravel the crop. The mowing beam 5, which is fastened to the mower at its side ends, contains a plurality of cutting compartments 3, which have one stop edge 1 above and one stop edge 1 below the blade 4 respectively. The top stop edges are provided with a toothing, while the bottom stop edges are formed on the wing-like parts 33 and may, if required, likewise be provided with a toothing. Between the wing-like parts 33 and the mowing beam 5 a gap 6 is formed to permit the free passage of the blades 4.

During a cutting cycle all the parts of the movable member formed by the blade 4 and the hook 31 describe the circle K which is shown in the figure and on which four positions I to IV are marked. Position I designates the instantanous state illustrated, in which the mowing crop is situated, already compacted, in the right-hand part of the cutting compartment 3.

From the position I the blade 4 moves backwards in the counterclockwise direction to the position II, and the tangential cut is made. Directly during or after the cutting the hook 31 comes into action; it pushes the cut mowing crop together and pulls it towards the rear, so that it is thrown off in that direction. The outward flow of the mowing crop is thus ensured not only by the forward movement by the mower, but additionally also by the pulling action exerted by the hook 31.

During the movement on the circle K from the position II to the position IV the blade 4 and the hook 31 are entirely outside the cutting compartment 3, so that the mowing crop approaching from the front can enter the cutting compartment 3 unhindered. Only in the position IV do the blade 4 and the hook 31 enter the cutting compartment 3 again and start to compact the mowing crop.

The arrangement illustrated in FIG. 9, in which the blade 4 is movable, is particularly suitable for grass areas where there are many weeds, which may also have tough, coarse stalks. In the case of ornamental lawns, in which fine grasses predominate, however, such weeds are largely absent. Here the exemplary embodiment shown in FIG. 10, which has a stationary blade 36, is very advantageous.

In the exemplary embodiment illustrated in FIG. 10, as in the case of FIG. 9, the driving rod 9 is in the form of a recumbent U-shaped profile and the movable member 2 (FIG. 1) is a twin member. The latter consists of two feeders 23 disposed one above the other and spaced apart, the upper feeder being fastened on the top side wall and the lower feeder on the bottom side wall of the profile forming the driving rod 9.

At its end face remote from the driving rod 9 the mowing beam 5 is provided with offset webs 35 on which horn-like members 34 for unravelling the mowing crop are mounted. The stop edges of the cutting compartments 3 are formed by blades 36 set into the latter, and the feeders 23 disposed above and below the blades 36 are provided on their longitudinal edge facing the blade 36 with indentations 24, which are so shaped that on the one hand the grasses can easily enter and pass out, but on the other hand are secured in such a manner that during the cutting they cannot yield at the cutting edge of the blades 36. The blades 36 are fastened on the mowing beam 5 such that they can be exchanged in a simple manner.

By means of the comb-like feeders 23 disposed one on each side of the blades 36 the grasses are gripped twice and guided along the cutting edges of the blades such that a tangential cut is made. As the moving parts are not sharp blades but blunt feeders, the possible risk of injury to people and animals is largely eliminated.

The circular movement of the feeders 23 is indicated by a circle K on which, similarly to FIG. 9, four positions I to IV are marked. The cutting edges of the blades 36 form approximately a quarter-circle between the positions II and III on the circle K representing the path of movement of the feeders 23. The region in which the tangential cut is made lies inside this quarter-circle. In the region of the blades 36 the mowing beam 5 has a configuration such that the stubble formed during the cut does not give rise to jamming but can draw back.

The individual indentations 24 in the feeders 23 should have dimensions such that about 5 to 10 ornamental grasses in compacted form can be received in them. Observations and measurements have in fact shown that with a diameter of the circle K corresponding to the dimensions of the cutting space inside a cutting compartment 3, of about 3 centimeters, in a mower of the kind described about 40 to at most 60 grasses can be cut per cutting cycle.

On being gripped by the feeders 23 the grasses are momentarily accelerated to a peripheral speed of about 3 to 4 meters per second and after the cut leave the cutting compartment 3 in the rearward direction towards the mown part of the grass area. They then drop either onto the ground or onto a conveyor belt leading to a grass collector. Thus in any case the eminently important outward flow of grass is ensured in a very satisfactory manner.

I claim:

1. Apparatus for cutting down elongated standard crops comprising at least one cutting compartment to receive the crop, said cutting compartment having a static member which forms a stop edge for the crop, a movable member which compacts the crop in the cutting department and which cooperates with the static member to cut off the crop during a cutting operation, moving means operatively associated with the movable member for moving the movable member substantially parallel to the stop edge during the cutting operation to effect a tangential cutting off of the crop at the stop edge and for moving the movable member substantially out of the cutting compartment after the cutting off of the crop to allow additional crop to enter the cutting compartment.

2. Apparatus according claim 1, wherein said at least one cutting compartment includes a plurality of cutting compartments which are disposed side by side and are open on one side for the entry of crop, each of the cutting compartments being approximately U-shaped or V-shaped in cross section and having oppositely positioned legs, at least one of the legs of each cutting compartment forming a static member, each cutting compartment having a movable member associated therewith.

3. Apparatus according to claim 2, wherein each movable member has an elongated shape, is directed parallel to the leg forming the static member and is driven circularly.

4. Apparatus according to claim 1, wherein at least one of the movable member and the static member is a cutting blade.

5. Apparatus according to claim 3, wherein the leg forming the static member of each cutting member is directed obliquely to the direction in which crop enters the cutting compartment.

6. Apparatus according to claim 5, wherein the obliquely disposed static members are disposed at an angle of inclination of from 20° to 30° with respect to the direction in which crop enters the cutting compartment.

7. Apparatus according to claim 5, wherein each movable member moves along a circular path of movement, the depth of each of the cutting compartments being at least equal to the diameter of the circular path of movement of the movable members.

8. Apparatus according to claim 7, wherein each cutting compartment is provided with two movable members in the form of cutting blades which are driven by the moving means with a phase displacement of 180°.

9. Apparatus according to claim 7, wherein the stop edge forming the static member of each cutting compartment includes means for securing the crop.

10. Apparatus according to claim 9, wherein said means for securing the crop includes one of toothing, grooving, or indentations formed on the stop edge.

11. Apparatus according to claim 7, wherein each cutting compartment is provided with a pair of stop edges disposed above and below a plane in which is located the movable member, and including one of a gap and depression formed between the stop edges of each pair for allowing at least partial entry of the movable member.

12. Apparatus to claim 11, wherein each movable member has associated therewith a hook which is movable with the movable member for compacting the crop and assisting in an outward flow of the crop after the cutting, the movable memberand the associated hook being spaced apart and extending on opposite sides of one of the stop edges during movement.

13. Apparatus according to claim 7, wherein the moving means includes a driving rod which is eccentrically mounted on motor-driven driving wheels, each of the movable members being mounted on the driving rod.

14. Apparatus according to claim 13, wherein the driving wheels are frictionally connected by way of cogged belts.

15. Apparatus according to claim 7, wherein each static member is in the form of a cutting blade and each movable member is in the form of a feeder for the crop.

16. Apparatus according to claim 15, wherein the feeders each include an edge which faces one of the static members and which is provided with indentations that assist in carrying-along the crop.

17. Apparatus according to claim 16, wherein the feeders are comprised of two parts, one part of which is disposed below a plane in which is disposed the cutting blade and the other part of which is disposed above the plane in which is disposed the cutting blade.

18. Apparatus according to claim 1, wherein the movable member is comprised of an elongated blade that is pivotable relative to the stop edge, the elongated blade being provided with one of a wavy cutting edge and toothing.

19. Apparatus according to claim 18, including an elongated cutting beam, wherein said at least one cutting compartment includes a plurality of cutting compartments formed in the cutting beam and arranged in oppositely disposed pairs on each longitudinal side of the cutting beam, and the movable member including a single elongated blade is associated with each pair of cutting compartments lying opposite one another.

20. Apparatus according to claim 19, wherein each blade includes two halves and an intermediately disposed middle part, each half of each blade being provided with a cutting edge, the cutting edges on the two halves of the blade being disposed on opposite longitudinal edges of the blade, the means for moving including a motor-driven driving rod, the middle part of each blade being pivotally mounted on a pin carried by the motor-driven driving rod.

21. Apparatus according to claim 20, including spring means which act on the middle part of the blades and which hold the blades under initial stress in an unpivoted normal position.

22. Apparatus for cutting down standing crops, comprising a mowing beam, a plurality of cutting compartments formed in the mowing beam, said cutting compartments each having oppositely positioned legs and being open along one side to receive crop that is to be cut down, one of the legs of each cutting compartment defining a stop edge for the crop, a plurality of movable members which are each associated with a respective one of the cutting compartments for cooperating with the stop edge of the respective cutting compartment to cut off the crop received in the respective cutting compartment, moving means connected to each of the movable members for simultaneously moving each of the movable members in an orbital path of movement around the respective cutting compartment and across the open side so that the movable member cooperates with the stop edge during the cutting operation to effect a substantial tangential cutting off of the crop at the stop edge.

23. Apparatus according to claim 22, wherein said moving means includes a driving rod to which each of the movable members is connected and a motor driven pulley on which the driving rod is eccentrically mounted.

24. Apparatus according to claim 22, wherein the plurality of cutting compartments includes cutting compartments arranged side-by-side, the mowing beam being provided with grooves located on opposite sides of the cutting compartments, the moving members moving into the grooves during the orbital path of movement.

25. Apparatus according to claim 22, wherein the plurality of cutting compartments are arranged as pairs along opposite longitudinal sides of the mowing beam, each movable member being associated with a pair of cutting compartments so that the crop in the pair of cutting compartments is cut off by the cooperation of one of the movable members and the stop edges in the respective cutting compartments.

* * * * *